Patented May 11, 1937

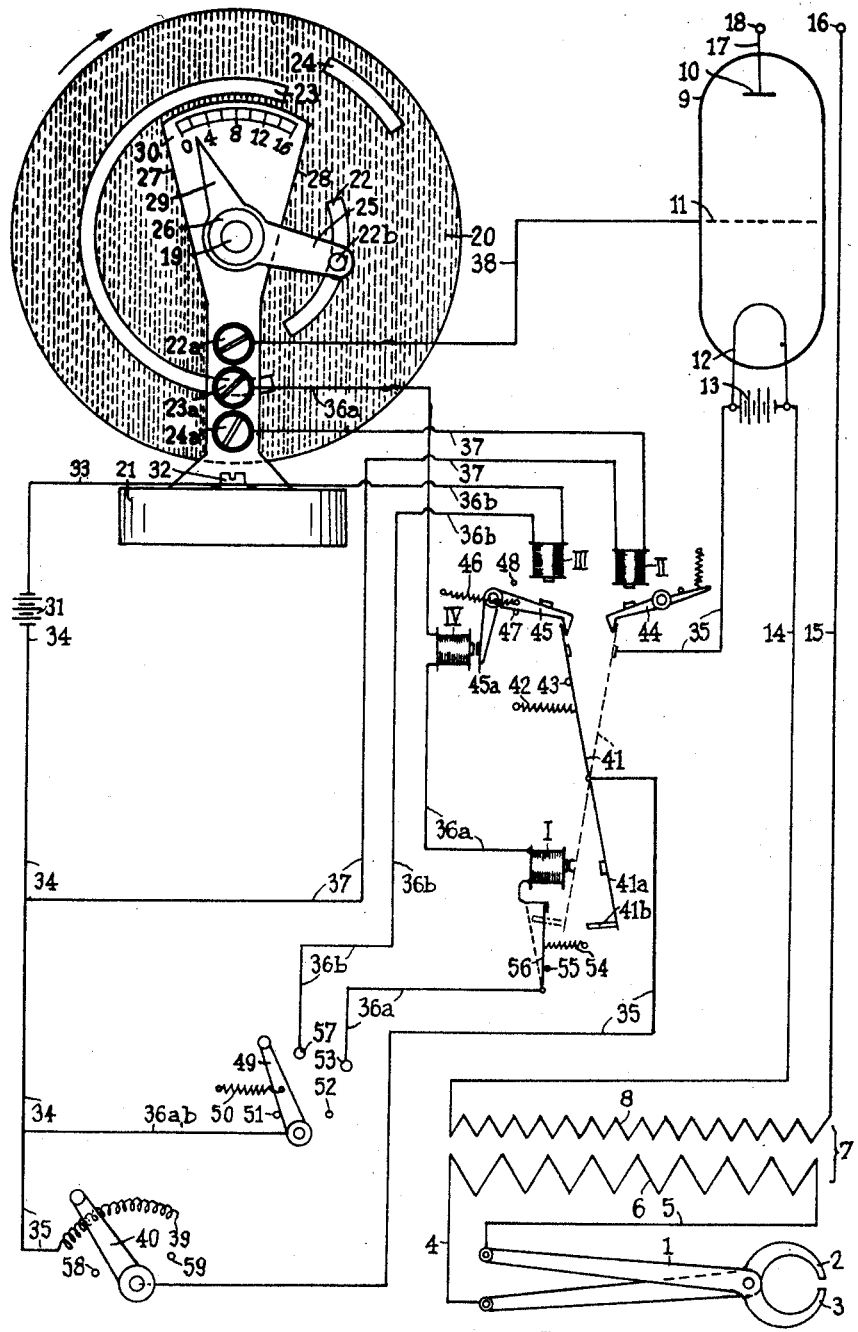

2,080,380

UNITED STATES PATENT OFFICE 2,080,380

CIRCUIT SYSTEM FOR ELECTRIC INSTANTANEOUS SPOT WELDING

Ludwig Schiff, Berlin-Lichterfelde, Germany, assignor to Edward G. Budd Manufacturing Company, Philadelphia, Pa.

Application September 13, 1933, Serial No. 689,166
In Germany September 17, 1932

8 Claims. (Cl. 250—27)

In electric spot welding in many cases, e. g. for welding thin sheets of austenitic stainless steel, it is necessary to apply high currents and to limit the duration of current application, e. g. to from $\frac{1}{200}$–$\frac{1}{500}$ of a second or less. This requisite short interval of time must be exactly kept to. If the interval is made too short, the welding is insufficient, if too long, the metal of the welding spot and the surrounding metal are affected detrimentally. The required high current is produced by means of a transformer, the secondary coil of which is connected with the welding electrodes, whilst a current of higher voltage is sent through the primary coil for the required interval.

This arrangement has the disadvantage, that in the primary circuit the same quantity of electric energy has to be controlled as is applied at the welding spot. The high voltage gives rise to an electric arc at the points where the current is interrupted. Furthermore all parts must be carefully insulated. Owing to the magnitude of the current to be controlled in the primary circuit and owing to the careful insulation required the controlling devices cannot easily be kept in clear survey. It is thus difficult to locate defects which may occur in the operation.

The purpose of the invention is to enable only a small fraction of the energy needed for the welding to be controlled instead of the total amount as hitherto, without affecting the exact adjustment and punctuality of the extremely minute welding intervals, or the adjustment and regularity of the requisite intensity of the primary current, and further without interfering in any way with the times of starting and stopping the welding.

According to the invention the primary circuit is not controlled directly, but by means of an electron-tube acting as a relay—eventually by a member of electron-tubes connected parallel to one another—the anode-circuit of which is led through the primary coil and the grid-circuit of which is controlled. For the purpose in view an electron-tube—such as is used in broadcasting—would probably suffice, through which a current of 1 amp. and 1000 volts may be passed, and controlled by the grid. If the amplification obtainable by the tube is 1:100, then with a voltage of 1000 volts in the anode-circuit only 10 volts have to be applied to the grid.

Since the primary current is not controlled directly but by means of the grid-circuit, there need be in the anode or primary circuit no movable or adjustable parts. The relay effect is produced by the tube working without the slightest inertia, instantaneously and with utter exactitude.

As only an extremely minute amount of electric energy has to be controlled, the weight of the devices controlling the grid-circuit can be much less than that of the devices hitherto employed for directly controlling the primary circuit. The whole control arrangement is thus made essentially simpler, easier to survey, and less expensive.

For controlling the grid-circuit, which has to be closed for an exactly measured, minute welding time, of e. g. from $\frac{1}{200}$–$\frac{1}{500}$ sec. an oscillation-circuit formed by a capacity and a self-induction could be used adjusted to a definite oscillation-rate, and it might be possible by means of a suitable device to allow only of a single oscillation to be transmitted. On the same principle (capacity and self-induction) it would be possible to send to the grid-circuit a wave train, the duration of which would be determined by the adjustment of the self-induction and the capacity.

The exact adjustment of the duration of the closing of the grid-circuit, and thereby also the exact adjustment of the welding-time, however could also be effected in a simple manner mechanically by inserting on the plane outer surface of a disc revolving at regular speed (or on the cylindrical outer surface of a drum) a metal ring sector which effects the closing of the grid-circuit whenever the workman wishes to carry out a spot welding operation after having properly prepared for the closing of the circuit. The effective length of the metal ring sector must be adjustable at will in accordance with the welding time desired. In doing this care must be taken, that the whole length of the metal ring sector which is required for closing the grid-circuit is actually used, and further the closing of the grid-circuit can only be effected during a single revolution of the controlling disc (or drum), but that the grid-circuit shall remain interrupted during the further revolutions, even when the operating workman still keeps his switch closed.

One form of construction of such a mechanical device for controlling the grid-circuit is exemplified schematically in the drawing.

A welding device 1 (a pair of welding tongs is shown schematically) operated by a workman bears the two welding electrodes 2 and 3, which are connected with the ends of the secondary coil 6 of a transformer 7 by flexible conductors 4 and 5. 8 is the primary coil of the transformer. 9 is an electron-tube. 10 is the anode, 11 the grid and 12 the incandescent cathode of the electron-tube 9. 13 is the heating battery for the incandescent cathode 12. The incandescent cathode 12 is connected with one end of the primary coil 8 of transformer 7 by a conductor 14. The other end of the primary coil 8 is connected by a conductor 15 with a terminal 16, the anode 10 by a conductor 17 with a terminal 18, and the terminals 16 and 18 are connected with a source of current (not shown) capable of supplying the maximum current which has to be passed in the extremest case through primary coil 8 of the transformer.

The control of the current sent through primary coil 8 and electron-tube 9 is not effected directly, but by controlling the grid-circuit.

On a shaft 19 is fixed a disc 20 driven at a constant rate of revolution by an electric motor (not shown) in the direction shown by the arrow. The front end of the shaft 19 is supported by a stand 21. In the disc 20, which is made of insulating material, three ring sectors 22, 23 and 24 are embedded. The ring sector 22 is completely insulated, whilst ring sectors 23 and 24 are connected by a conductor with the axis 19 and thereby with the stand 21. In the stand 21 are lodged insulated pegs 22a, 23a and 24a, which are pressed springwise against the disc 20 and are able to slip over the ring sectors 22, 23, 24 resp., as the disc 20 revolves. Furthermore on the axis 19 an arm 25 is rotatably mounted which can be turned by means of a knob 26 between two stops 27 and 28 fixed on the stand 21, and which retains its position to which it is adjusted. The position of arm 25 can be read by means of an indicator 29 on a scale 30 connected with the stand 21. The figures given on the scale signify e. g. thousandths of a second. In the arm 25 a current-conducting peg 22b is mounted, which presses springwise against the disc 20 and slips over ring sector 22 as the disc revolves. The one pole of a battery 31 is permanently connected by means of a conductor 33 leading to clamp screw 32 of stand 21 with the stand 21, and by the latter with the shaft 19 and with the metal ring sectors 23 and 24, as well as with the arm 25 and the contact peg 22b. With the other pole of the battery 31 a conductor 34 is connected from which four different branch conductors 35, 36a, 36b and 37 issue corresponding to four different circuits.

Conductor 35 lies in the grid-circuit and is connected to the incandescent cathode 12. The grid 11 is connected by means of conductor 38 with the insulated peg 22a.

The grid-circuit has to be closed for the desired short welding period of e. g. 1/200 sec. During the closing of the grid-circuit current flows through the anode-circuit and through the primary coil 8 of the transformer 7.

In order to regulate the voltage applied to grid 11, and thereby the strength of the current flowing in the anode circuit and through the primary coil 8 of the transformer 7, there is inserted into the grid-circuit a regulatable resistance 39. According to the position of the lever 40, on which it is set between the stops 58 and 59, a greater or smaller portion of the resistance 39 is included in the grid-circuit.

The grid-circuit is interrupted so long as both the insulated peg 22a and the conducting peg 22b are not sliding simultaneously on the metal ring sector 22. The angle of rotation of disc 20 during which the pegs 22a and 22b are simultaneously in contact with the metal ring sector 22 depends upon the position given to the arm 25. By turning the arm 25 the duration of the contact can be adjusted at will between zero and a certain maximum.

The closing of the grid-circuit must be effected by the workman carrying out the welding operation. Care must be taken that the closing of the grid-circuit does not take place in the period during which the contact pegs 22a and 22b have already covered a part of their stroke on the ring sector 22, because otherwise the grid-circuit would be closed not throughout the whole welding time corresponding to the position of arm 25, but only during a portion of it. Therefore the grid-circuit must not be closed directly, but indirectly, by the workman. For this purpose a circuit-closing-lever 41 is inserted into the circuit 35. A spring 42 tends to draw the circuit-closing-lever 41 towards a stop 43, up to the position shown in the drawing by full line, and thereby to interrupt the grid-circuit. In its other position, shown by dotted line, the grid-circuit is closed by the circuit-closing-lever 41. The circuit-closing-lever 41 can be locked in its closing position by means of a pawl 44 and in its open position by means of a pawl 45. The pawl 45 is made tiltable. It is held fixed by the spring 46 either in the one end position determined by the stop 47 or in the other end position determined by the stop 48. The displacement of circuit-closing-lever 41 into its closing position is effected by the closing of the circuit 36a. The closing of the circuit 36a is effected by the workman carrying out the welding operation by means of a circuit-closing lever 49 which is drawn by a spring 50 into the position shown onto stop 51. If the lever 49 is moved contrary to the pull of spring 50 into its extreme position on the right, as determined by stop 52, the conducting connection with contact-piece 53 is established. In the conductor 36a an electro-magnet I is arranged opposite the extension 41a of the circuit-closing-lever 41. If a current shock is sent through the electric-magnet I, and if the circuit-closing-lever 41 is not locked by the pawl 45, then the circuit-closing-lever 41 is swung over by the electro-magnet I contrary to the pull of the spring 42 from the position shown in full line into the position shown in dotted line, in which it closes the grid-circuit.

On the one hand the grid-circuit must not be interrupted before both the pegs 22a and 22b have slid over the metal ring sector 22, and on the other hand care must be taken that the grid-circuit is only closed once by the metal ring sector 22, and that it is again interrupted by the lever 41, and remains interrupted during the following stroke of the pegs 22a and 22b over the ring sector 22, even when the circuit-closing-lever 49 is still held on the contact-piece 53. For this purpose the circuit 36 is automatically interrupted by the lever 41 being turned into the position shown in dotted line. On the arm 41a a finger 41b is fixed by which in the position of the lever 41 shown in dotted line the lever 56—drawn by a spring 54 onto a stop 55 and in this position closing the circuit 36a—is swung over contrary to the pull of the spring 54 into its position shown by dotted line in which position the circuit 36a is interrupted. As the electro-magnet I owing to the interruption of circuit 36a is no longer active, the lever 41 would be swung over by spring 42 out of its closing position as shown by dotted line back into its interrupting position as shown by full line, if it were not retained in its closing position by the pawl 44. The pawl 44 is, however, automatically disengaged, when the metal ring sector 22 has passed the pegs 22a and 22b and has thereby interrupted the grid-circuit. A metal ring sector 24 is so arranged as to slide under the insulated peg 24a, after the metal ring sector 22 has passed the pegs 22a and 22b. The metal ring sector 24 closes the circuit 37, and thereby brings into activity an electromagnet II placed in the circuit 37 and disengaging the pawl 44. This causes the circuit-closing-lever 41 to be drawn back by spring 42 into the position shown by full line, in which it is at first held fixed by the pawl 45. The grid-circuit 35 therefore remains interrupted, in spite of the lever 56 having been released by the peg 41b and having closed the circuit 36a, and the circuit remains interrupted, even when the workman still retains the lever 49 in the position in which it rests upon contact-piece 53.

Before the grid-circuit can be closed anew the workman must have released the lever 49. As it returns the lever 49 comes into contact with the contact-piece 57, thus closing the circuit 36b. An electro-magnet III placed in the circuit 36b draws the pawl 45 out of its end position, as shown, in which it is pressed by spring 46 against the stop 47 into its other end position in which it is held pressed against stop 48 by the spring 46.

When the workman now moves the lever 49 again into its end position on the right, in which it touches the contact-piece 53, the circuit 36a is closed, the circuit-closing-lever 41 is drawn back again into the position, as shown by dotted line, the grid-circuit 35 is closed, the current is sent during the closing of the grid-circuit through primary coil 8 of transformer 7 ... and so on.

It is now still necessary that the pawl 45 should again engage at the proper time into the position shown by full line, in order that the circuit-closing-lever 41 may be locked again by pawl 45 after the grid-circuit has been interrupted. For this purpose there is placed in the circuit 46 an electro-magnet IV which, as soon as the circuit 36a is closed, actuates the arm 45a and swings over the pawl 45 to the position shown until it strikes upon stop 47.

As only comparatively weak currents of comparatively low voltage flow in the circuits fed by the battery 31, the levers serving to close these circuits and the pawls serving to lock the circuit-closing-lever can be of comparatively light construction. On the other hand the electro-magnets I-IV can be made so strong, as to enable the movements of the light parts actuated by them to be effected with extraordinary swiftness.

I claim:—

1. A control system for an electrical work circuit requiring brief applications of a large volume of alternating current comprising a primary control circuit, periodic switching means for periodically partially closing said primary control circuit, auxiliary switching means for partially closing said primary control circuit, an auxiliary control circuit controlling said auxiliary switching means, means for partially closing said auxiliary control circuit during the non-closing periods of said periodic switching means, manual means for partially closing said auxiliary control circuit, closed circuit locking means for locking said auxiliary switching means in circuit closing position, means for releasing said locking means between the ending of a periodic partial closure of the primary control circuit by the periodic switching means and the beginning of a periodic partial closure of the auxiliary circuit, open circuit locking means for locking the auxiliary switching means in open circuit position, and manually controlled means for releasing said open circuit locking means.

2. A control system for an electrical work circuit requiring brief applications of a large volume of alternating current comprising an electron-tube relay having a grid control element and arranged to directly close and open the work circuit, a grid circuit for said grid control including a source of current, mechanical periodic switching means for periodically partially closing said grid circuit, auxiliary switching means for partially closing said grid circuit operable to initiate such closure only during the non-closing periods of said periodic switching means, and closed circuit locking means for holding said auxiliary switching means in closed circuit position over a period including the closure period of said periodic switching means.

3. A control system for an electrical work circuit requiring brief applications of a large volume of alternating current comprising an electron-tube relay having a grid control element and arranged to directly close and open the work circuit, a grid circuit for said grid control, a source of current included in said grid circuit, a grid circuit timing switch for partially closing said grid circuit for a predetermined period of time, auxiliary switching means for partially closing said grid circuit, an auxiliary control circuit for actuating said auxiliary switching means, means controlled at will for partially closing said auxiliary control circuit, an auxiliary-circuit timing switch for partially closing said auxiliary circuit only during the non-closure of said grid circuit timing switch, closed circuit locking means arranged to hold the auxiliary circuit closed after complete closure, and means for releasing said closed circuit locking means after completion of a closure period of said grid circuit timing switch.

4. A control system for an electrical work circuit requiring brief applications of a large volume of alternating current, comprising an electron-tube relay having a grid control element and arranged to directly close and open the work circuit, a grid circuit for said grid control including a source of current, mechanical periodic switching means for periodically partially closing said grid circuit, auxiliary switching means for partially closing said grid circuit operable to initiate such closure only during the non-closure periods of said periodic switching means, closed circuit locking means for holding said auxiliary switching means in closed circuit position over a period including the closure period of said periodic switching means, means for releasing said auxiliary switching means, open circuit locking means for holding said auxiliary switching means in open circuit position, and means operable at will for releasing said open circuit locking means.

5. A control system for an electrical work circuit requiring brief applications of a large volume of alternating current comprising an electron-tube relay having a grid control element and arranged to directly close and open the work circuit, a grid circuit for said grid control, mechanical periodic switching means arranged to periodically partially close said grid circuit, auxiliary switching means arranged to partially close said grid circuit and controlled in time relation with said periodic switching means to initiate such closure only during the non-closure periods of said periodic switching means, closed circuit locking means for said auxiliary switching means operable to lock said switching means in closed circuit position during a closure period of said periodic switching means, open circuit locking means for said auxiliary switching means, and manual means for alternately effecting a release of said open circuit locking means and a circuit closing operation of said auxiliary switching means.

6. A control system for an electrical work circuit requiring brief applications of a large volume of alternating current comprising an electron-tube relay having a grid control element and arranged to directly close and open the work circuit, a grid circuit for said grid control, mechanical periodic switching means for periodically partially closing said grid circuit for a predetermined short interval of time, auxiliary switching means for partially closing said grid circuit, and means controlled in synchronism with the operation of said periodic switching means for preventing said auxiliary switching means from changing from circuit-opening to circuit-closing condition and vice versa during circuit-closing condition of said periodic switching means.

7. A control system as claimed in claim 1 in which the grid circuit includes a variable resistance for adjusting the voltage applied to the grid.

8. A control system as claimed in claim 1 with means for maintaining the auxiliary circuit open during closure of the primary control circuit.

LUDWIG SCHIFF.